United States Patent [19]

Fanning

[11] 4,424,667

[45] Jan. 10, 1984

[54] APPARATUS FOR INCREASING THE EFFICIENCY OF A GAS TURBINE ENGINE

[76] Inventor: Arthur E. Fanning, 7855 Bigger Rd., Centerville, Ohio 45459

[21] Appl. No.: 386,156

[22] Filed: Jun. 7, 1982

[51] Int. Cl.³ .......................... F02C 7/08; F02C 7/143
[52] U.S. Cl. .................................... 60/39.181; 60/728
[58] Field of Search ................. 60/39.02, 39.181, 728, 60/266, 267; 62/402

[56] References Cited

U.S. PATENT DOCUMENTS

| | | | |
|---|---|---|---|
| 2,992,529 | 7/1961 | Sampietro | 60/728 |
| 3,651,645 | 3/1972 | Grieb | 60/262 |
| 3,668,884 | 6/1972 | Nebgen | 62/402 |
| 3,788,066 | 1/1974 | Nebgen | 60/728 |
| 3,796,045 | 3/1974 | Foster-Pegg | 60/39.02 |
| 3,982,378 | 9/1976 | Sohre | 62/5 |
| 4,137,705 | 2/1979 | Anderson et al. | 60/39.08 |

Primary Examiner—Louis J. Casaregola
Attorney, Agent, or Firm—Donald J. Singer; John R. Flanagan

[57] ABSTRACT

Apparatus for improving the operating efficiency of a gas turbine engine includes a heat pump and a pair of heat exchangers for use in conjunction with the engine. The first heat exchanger is disposed in the flow path of the engine upstream of its compressor section, while the second heat exchanger is disposed in the engine flow path downstream of the compressor section and upstream of the combustor section of the engine. A portion of the work output of the engine is used to operate the heat pump so as to cause cooling of air in the flow path at the first heat exchanger and heating of air in the flow path at the second heat exchanger.

5 Claims, 2 Drawing Figures

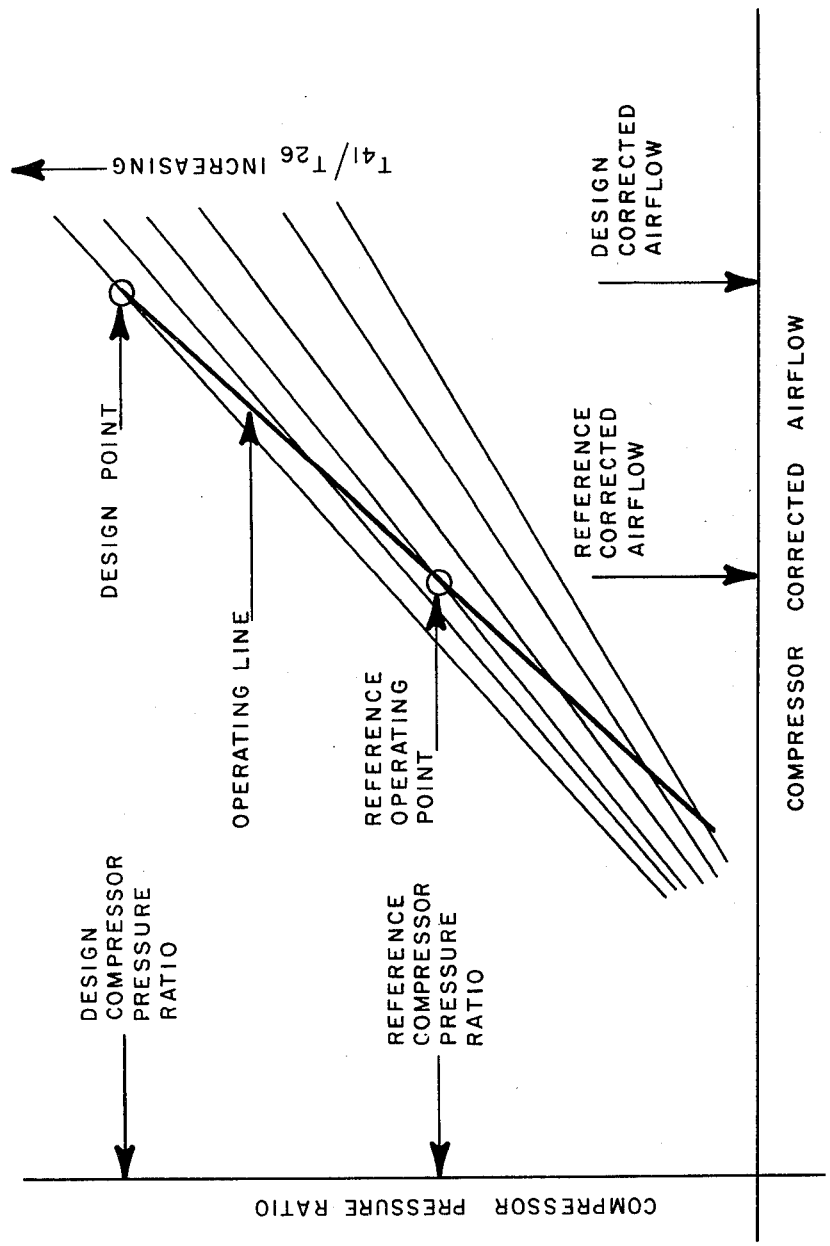

APPARATUS FOR INCREASING THE EFFICIENCY OF A GAS TURBINE ENGINE

RIGHTS OF THE GOVERNMENT

The invention described herein may be manufactured and used by or for the Government of the United States for governmental purposes without the payment of any royalty.

BACKGROUND OF THE INVENTION

1. Field of the Invention

The present invention broadly relates to gas turbine engines and, more particularly, is concerned with the inclusion of a heat pump and associated heat exchanger in a gas turbine engine for improving the overall efficiency thereof.

2. Description of the Prior Art

In many applications, gas turbine engines are operated more frequently to produce only a portion of their related maximum work output for which they were designed. Examples of such applications include the use of gas turbine engines as the primary source of power in the propulsion systems of aircraft, ships, and land vehicles. In such applications, it is common to encounter situations where over a period of time a greater proportion of the total fuel consumed in the engine occurs when the engine is operating to produce only a portion of its rated maximum work output than when the engine is operating to produced rated maximum work output. The large proportion of fuel consumption by the engine at work output levels less than the rated maximum output level results not only from the greater lengths of time of engine operation at sub-maximum output levels, but also because of inherently less efficient operation of the conventional gas turbine engine at reduced work output levels.

The overall efficiency with which a gas turbine engine operates can be expressed partially as the thermal efficiency, which is the ratio of the rate at which energy is made available to do work to the rate at which energy is released by the combustion of fuel. For conventional gas turbine engines with representative levels of component inefficiencies, greater values of the total temperature of the gas entering the high pressure turbine section of the engine, generally yield greater values of thermal efficiency. For a gas turbine engine of conventional design, the rate at which air enters the compressor section of the engine and the total temperature of the gas entering the turbine section of the engine are interrelated in a manner which necessitates a decrease in the total temperature of the gas entering the turbine section when it is desired to decrease the airflow through the engine. Therefore, since one of the principal means used to decrease the work output of a gas turbine engine below its rated maximum is to decrease the rate of airflow through the engine, it is readily seen that operation of the engine at work output levels substantially less than its rated maximum reduces the total temperature of the gas entering the turbine section and results in a substantial decrease in the thermal efficiency of engine operation.

U.S. Pat. No. 3,796,045 to Foster-Pegg proposes certain modifications for a gas turbine power plant for improving the power output and/or the thermal efficiency thereof. In FIG. 2 of the patent, an embodiment is illustrated wherein compressed air from a compressor is heated in a regenerator heat exchanger by waste heat in the turbine exhaust gases before the compressed air enters the combustor. Also, heat in the turbine exhaust gases is recovered and converted into mechanical energy for driving cooling means for superchilling inlet air to the compressor.

While the arrangements of the aforementioned patent may accomplish its intended purpose, it appears to require a rather complicated and elaborate system for doing so. Therefore, a need exists for a simpler alternative arrangement for fostering improvement in operating efficiency of a gas turbine engine.

SUMMARY OF THE INVENTION

The present invention provides apparatus designed to satisfy the aforementioned need. Through use of the present invention, desired variations of the work output of the gas turbine engine can be produced, without sacrificing operating efficiency of the engine. To a greater degree, the variations are a consequence of varying the rate at which air flows through the gas turbine engine and, to a lesser degree, are a consequence of varying the total temperature of the gas entering the turbine section of the engine. Such variations are not possible in conventional gas turbine engines without sacrificing some operating efficiency of the engine.

Variation of the rate at which air flows through the engine and of the total temperature of the gas entering the turbine section of the engine is accomplished by causing a heat pump, whose source of driving power is a portion of the work output of the engine and whose associated heat exchangers are incorporated into the flow path of the engine, to operate when the desired work output of the engine is greater than a preselected proportion of the rated maximum output of the engine. Operation of the heat pump results in a decrease in the total temperature of the air entering the compressor section of the engine. This allows a greater amount of air to flow through the compressor section with the result that a lesser increase in the total temperature of the gas entering the turbine section of the engine is necessary to produce increased work output. As a further consequence, this allows the gas entering the turbine section to be maintained at a high total temperature when the engine is operated to produce work output at levels less than the maximum rated work output level.

Additionally, the energy required to operate the heat pump and the energy extracted in the process of cooling the air entering the compressor section are recovered and used to decrease the amount of fuel which must be consumed to maintain the gas entering the turbine section at a high total temperature. This also is accomplished by operation of the heat pump which results in an increase in the total temperature of the air entering the combustor section of the engine.

The consequence of these various aspects of the present invention is that the gas turbine engine operates with improved thermal efficiency when producing work output less than the rated maximum work output.

Accordingly, the present invention relates to the use of a heat pump in conjunction with a gas turbine engine. The heat pump is driven by a portion of the output of a work extraction turbine of the engine and operates between two heat exchangers. The first heat exchanger, maintained at a lesser temperature by the operation of the heat pump, is disposed in the flow path of the engine at a position upstream of a compressor section of the engine. It provides the means by which the total temperature and consequently the rate at which air enters the compressor section may be controlled independently of the compressor operating conditions. The second heat exchanger, maintained at a greater temperature by the operation of the heat pump, is disposed in the flow path of the engine at a position downstream of the compressor section and upstream of the combustor section of the engine. It provides the means by which heat transferred from the air to the first heat exchanger and work extracted to operate the heat pump can be recovered and transferred to the air in the flow path of the engine before this air enters the combustor section. As a consequence of the increase in the temperature of this air, less fuel is required to raise its temperature to the desired level in the combustor section.

Furthermore, controls are provided for changing or switching the heat pump between operative and inoperative states or conditions.

BRIEF DESCRIPTION OF THE DRAWINGS

FIG. 2 is a graphical representation of the operating conditions of a gas turbine engine.

DETAILED DESCRIPTION OF THE INVENTION

Figure 1:
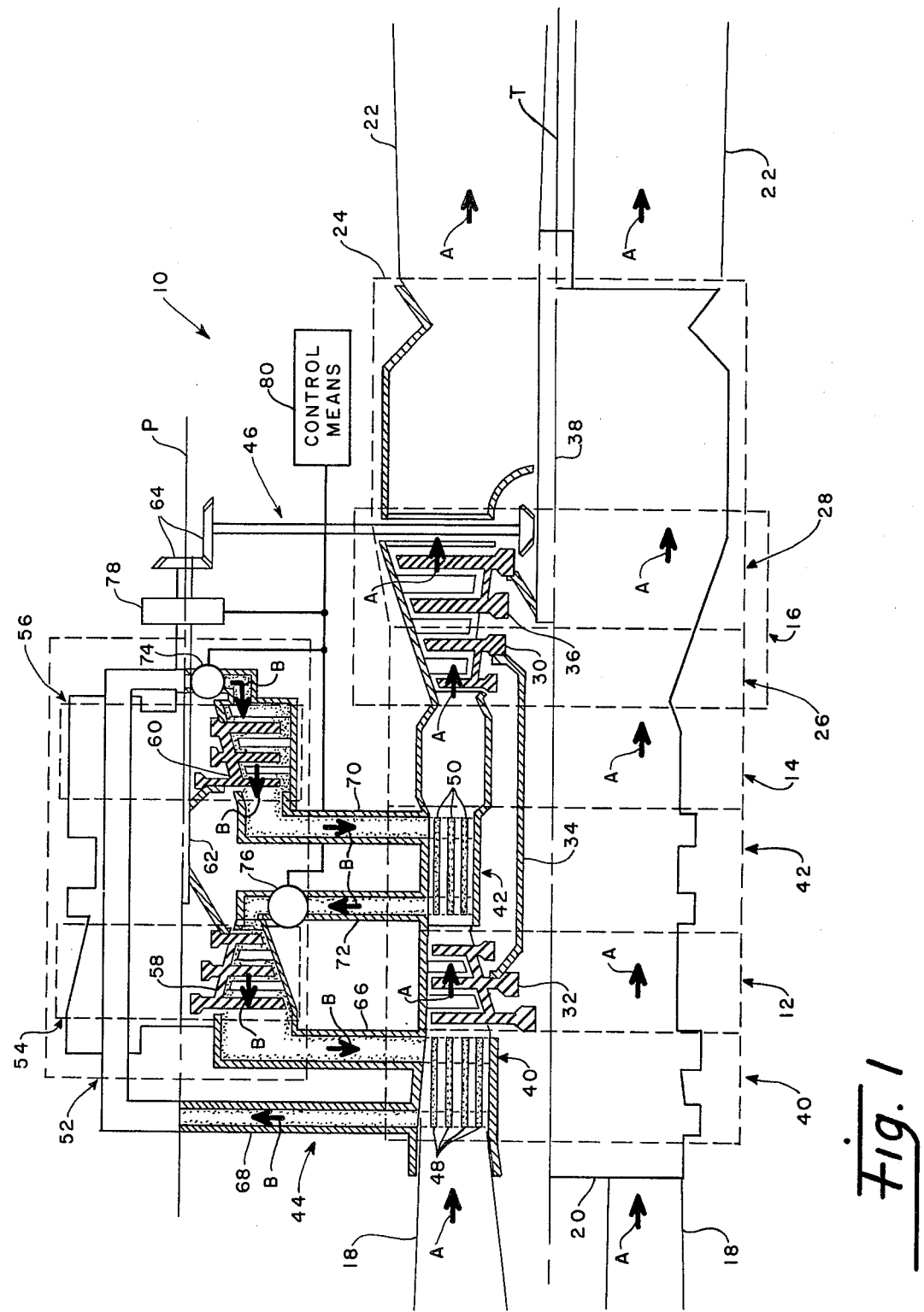
FIG. 1 is a side elevational view of a gas turbine engine incorporating the apparatus of the present invention and showing the upper half of the engine and lower half of a heat pump of the apparatus in cross-sectional form along a longitudinal plane which includes central axis T of the engine.

Referring now to the drawings, and more particularly to FIG. 1, there is shown, in schematic form, a gas turbine engine, generally designated 10, incorporating the preferred embodiment of the apparatus of the present invention. The gas turbine engine 10 conventionally includes, in serial relationship, a compressor section 12, a combustor section 14 and a turbine section 16. Each section has a cylindrical configuration about the longitudinal axis T of the engine 10. All of the sections together define a flow path through the engine 10 along which, initially, moves air and, later, products of combustion. The flow path is depicted by annular air stream 18 flowing into the annular-shaped intake end 20 of the engine 10 and annular combustion gas stream 22 flowing from the annular-shaped exhaust end 24 of the engine, with arrows A pointing the direction of the flow path through the engine.

The turbine section 16 includes a serially-arranged high pressure turbine 26 and work extraction turbine 28. A rotor 30 of the high pressure turbine 26 is connected to the rotor 32 of compressor section 12 for rotatably driving the same by a tubular shaft 34 rotatable about the central axis T of the turbine engine 10. A rotor 36 of the work extraction turbine 28 is connected to a work output shaft 38 for rotation therewith also about the turbine engine central axis T.

The primary components of the apparatus of the present invention are a first heat exchanger 40, a second heat exchanger 42, pumping means, generally designated 44, interconnecting the first and second heat exchangers, and coupling means 46 for driving the pumping means 44 with the engine output shaft 38. The first heat exchanger 40 includes a first plurality of concentrically-arranged annular rings 48 disposed within the flow path of the engine upstream of the compressor section 12. The second heat exchanger 43 includes a second plurality of concentrically-arranged annular rings 50 disposed within the flow path of the engine upstream of the combustor section 14 and downstream of the compressor section 12. The heat exchangers are of cross flow design or the like to permit transfer of heat between the air and the working fluid while preventing the mixing of the two.

The pumping means 44 includes a heat pump 52 and a series of conduits interconnecting the heat pump and heat exchangers 40, 42 so as to form a desired endless closed path for a working fluid, such as freon, air, nitrogen or any refrigerant gas with high specific heat capacity, circulated by the heat pump 52. Communication of working fluid between the heat pump 52 and the annular rings of the respective heat exchangers 40, 42 occurs in a way which causes cooling of air in the flow path of the engine at the first heat exchanger and heating of air in the flow path at the second heat exchanger. Arrows B in FIG. 1 point the direction of flow of the working fluid about the endless closed path of the pumping means 44, or heat pump circuit.

The heat pump 52 includes a turbine portion 54 and compressor portion 56. A rotor 58 of the turbine portion 54 is connected to the rotor 60 of the compressor portion 56 bg a shaft 62 rotatable about axis P, the extension of which to the right of the compressor portion 56 forms the work input shaft of the heat pump 52. The work input shaft 62 of the heat pump is connected to the output shaft 38 of the engine turbine section 16 by a drive train 64 of the coupling means 46. Thus, the heat pump is driven by the engine output shaft concurrently as the shaft is used to deliver work to accomplish any desired purpose.

The series of conduits, interconnecting the heat pump 52 and heat exchangers 40, 42, is comprised by first, second, third and fourth conduits 66, 68, 70 and 72. The first conduit 66 interconnects the output end of the turbine portion 54 of the heat pump 52 with the inlet end of the first heat exchanger 40 for providing flow of working fluid from the heat pump to the first heat exchanger. The second conduit 68 interconnects the outlet end of the first heat exchanger 40 with the input end of the compressor portion 56 of the heat pump 52 for providing return flow of working fluid from the first heat exchanger to the heat pump. The third conduit 70 interconnects the output end of the compressor portion 56 of the heat pump 52 with the inlet end of the second heat exchanger 42 for providing flow of working fluid from the heat pump to the second heat exchanger. The fourth conduit 72 interconnects the outlet end of the second heat exchanger 42 with the input end of the turbine portion 54 of the heat pump 52 for providing return flow of working fluid from the second heat exchanger to the heat pump.

At times it is desirable to operate the gas turbine engine 10 in a conventional manner, that is, with the heat pump 52 shut off or rendered inoperative. For accomplishing this the apparatus of the present invention further includes valve means in the form of first and second valves 74, 76 of conventional design incorporated in second and fourth conduits 68, 72, respectively, and clutch means 78 of conventional design incorporated in the drive train 64. The first valve 74, incorporated in the second conduit 68, is actuatable between open and closed conditions for respectively allowing and obstructing the flow of working fluid through the second conduit. The second valve 76, incorporated in the fourth conduit 72, is actuatable between open and closed conditions for respectively allowing and obstructing the flow of working fluid through the fourth conduit. The clutch means 78 is operatively connected with the drive train 64 and selectively actuatable for coupling and uncoupling the heat pump to and from the engine. Finally, control means 80, which may take any suitable conventional form, connects with each of the first and second valves 74, 76 and the clutch means 78 and may be activated to a first state for actuating the valves and clutch means so as to respectively close the valves and uncouple the parts of the drive train 64 for rendering the heat pump inoperative, or activated to a second state for actuating the valves and clutch means so as to respectively open the valves and couple together the parts of the drive train for rendering the heat pump operative. As mentioned before, when the heat pump is operative, it circulates the working fluid so as to cause cooling of air in the engine flow path at the first heat exchanger 40 and heating of air in the flow path at the second heat exchanger 42.

Incorporation of the apparatus of the present invention into a conventional gas turbine engine allows substantial beneficial changes to be made in the design of the engine. These changes relate primarily to the following parameters: (1) design compressor pressure ratio and (2) design airflow rate. During the design of a conventional gas turbine engine, the following information, among other, is necessary to select the values of the above-two parameters: (a) the reference total temperature of the air entering the engine; (b) the desired rated maximum work output of the engine; and (c) the maximum allowable total temperature of the gas entering the turbine section of the engine which meets the purpose of safety and durability. During the design of an engine incorporating the apparatus of the present invention, the following additional information, among other, is also necessary: (d) a reference work output level which corresponds to some proportion of the rated maximum work output of the gas turbine engine.

Then, based primarily on the reference total temperature of the air entering the engine and the maximum allowable total temperature of the gas entering the turbine section of the engine, a reference compressor pressure ratio which will provide high thermal efficiency of the engine can be selected. Following next, based primarily on this reference compressor pressure ratio, the maximum allowable total temperature of the gas entering the turbine section of the engine, and the pressure and temperature of the air entering the engine, a reference airflow rate into the engine can be selected, which will ensure that, when the gas turbine engine is operating at the maximum allowable total temperature of the gas entering the turbine section of the engine, the work output of the engine will equal the reference work output.

During the selection of the reference compressor pressure ratio and the reference airflow rate entering the engine, consideration is given to the effects of the pressure of the two heat exchangers 40, 42 in the flow path of the engine 10, although the heat pump 52 has been rendered inoperative by activating control means 80 so as to cause valves 74, 76 to close and clutch means 78 to uncouple the drive train 64. Thus, at steady state operation (heat pump 52 is inoperative) at the reference compressor pressure ratio, no heat is exchanged between the air in the flow path of the engine and the working fluid associated with the heat pump 52.

Referring now to FIG. 2, the operating conditions of the engine 10 when producing the reference work output are presented in a graphical manner, easily understood to those knowledgeable in the art of the design and operation of gas turbine engines. Based primarily on the design of the turbine section 16 of the engine 10 needed to sustain steady state operation at the reference operating point, it is possible to identify other combinations of compressor corrected airflow, pressure ratio and total temperature of the gas entering the turbine section of the engine at which steady state operation of the engine can be sustained. The operating line passing through the reference operating point represents combinations of compressor pressure ratio and compressor corrected airflow which meet these criteria. Corresponding to each point on the operating line, there is a specific value of the ratio $T_{41}/T_{26}$ (the total temperature, $T_{41}$, of the gas entering the high pressure turbine section 26 of the engine 10 to the total temperature, $T_{26}$, of the air entering the compressor section 12 of the engine) which must be maintained to sustain steady state operation at that point.

In the conventional gas turbine engine, no means of altering the total temperature of the air entering the compressor section is provided. Therefore, greater values of the ratio $T_{41}/T_{26}$ require greater total temperature of the gas entering the turbine section of the engine. Therefore, a gas turbine engine, not incorporating the apparatus of the present invention, but designed to meet the criteria described above, could not be operated at a point on the operating line in FIG. 2 having values of compressor pressure ratio and corrected airflow greater than at the reference operating point without exceeding the maximum allowable total temperature of the gas entering the high pressure turbine section of the engine.

In contrast thereto, a gas turbine engine 10 incorporating the apparatus of the present invention does provide a means of altering the total temperature of the air entering the compressor section 12 of the engine. It is, therefore, possible to operate the engine 10 at the conditions which correspond to the points on the operating line having values of compressor pressure ratio and corrected airflow greater than the reference operating point, without exceeding the maximum allowable total temperature of the gas entering the high pressure turbine 26 of the turbine section 16 of the engine 10. This can be accomplished by maintaining the total temperature of gas entering the high pressure turbine 26 at or near the maximum allowable temperature while causing the heat pump 52 to operate with a resultant decrease in the total temperature of the air entering the compressor section 12. In this manner, the ratio $T_{41}/T_{26}$ can be increased above that corresponding to operation at the reference operating point in FIG. 2.

A value for the ratio, $T_{23}/T_{26}$ (the total temperature of the air entering the first heat exchanger 40 to the total temperature of the air leaving the first heat exchanger 40) which corresponds to each value of the ratio $T_{41}/T_{26}$ and thus to each point on the operating line at compressor pressure ratios greater than the reference compressor pressure ratio can be defined similarly. Based, primarily, on the compressor corrected airflow and the ratio, $T_{23}/T_{26}$, the work required to drive the heat pump 52 to maintain this ratio can be defined for each point of interest on the operating line. Subsequently, both the total and net work output of the gas turbine engine 10 for each point on the operating line can be defined, where net work output is defined as total work output of the engine minus the work required to drive the heat pump. The compressor pressure ratio and corrected airflow at the point on the operating line where the engine is producing a net work output equal to the desired rated maximum work output are taken to be the design compressor pressure ratio and the design compressor corrected airflow. This point on the operating line is called the design point. The value of $T_{23}/T_{26}$ corresponding to this design point is useful in determining design parameters of the heat pump and associated heat exchangers.

In general, the result of this process is that a lesser design corrected airflow and a greater design compressor pressure ratio will be selected than in the conventional engine, and that the total temperature of the gas entering the high pressure turbine 26 of the engine 10 will first reach the maximum allowable temperature at the reference point rather than the design point. Operation of the apparatus of the present invention for work output of the engine at various levels along the operating line of FIG. 2 will now be described.

Consider first the case where the total temperature of the air entering the engine is equal to the reference design temperature and the engine is being operated to produce work output equal to the reference work output. At these conditions, the clutch means 78 has uncoupled the turbine output shaft 38 and the work input shaft 62 of the heat pump 52, so that no work is inputted to the heat pump and the heat pump is therefore inoperative. The first valve 74 and second valve 76 are in the closed position and the working fluid in the compressor portion 56 of the heat pump and in the second heat exchanger 42 is maintained at a greater total pressure than the working fluid in the work extraction turbine portion 54 of the heat pump and in the first heat exchanger 40, since the flow of working fluid between these regions is prevented by the closed valves 74 and 76. The compressor section 12 of the gas turbine engine 10 is operating at the reference compressor pressure ratio and the reference corrected airflow. The total temperature of the gas entering the high pressure turbine section 26 of the gas turbine engine is maintained at the maximum allowable level by adjusting the rate at which fuel flows to the combustor section 14 of the engine. After the engine has been operating at these conditions for sufficient time to allow thermal transients to diminish, the working fluid of the heat pump circuit in the first heat exchanger 40 will be brought to a temperature nearly equal to the total temperature of the air entering the engine, thereby minimizing the exchange of heat between this working fluid and the air flowing through the heat exchanger 40 in the flow path of the engine. Similarly, the working fluid of the heat pump circuit in the second heat exchanger 42 will be brought to a temperature nearly equal to the total temperature of the air leaving the compressor section 12 of the engine, thereby minimizing the exchange of heat between this working fluid and the air flowing through the heat exchanger 42 in the flow path of the engine. Since the clutch means 78 has caused the uncoupling of the drive train 64, none of the work extracted by the work extraction turbine 28 of the engine 10 is diverted to cause the heat pump 52 to operate. Thus, all work extracted in the turbine section 16 is available to be transferred through output shaft 38, and put to whatever purpose is desired.

When it is desired to operate the gas turbine engine 10 to produce work output less than the reference work output with the total temperature of the air entering the engine equal to the reference design temperature, the heat pump 52 is maintained in the inoperative state described above. With the heat pump thus maintained in an inoperative state, the work output of the engine 10 is reduced in the manner of conventional gas turbine engines. In general, this involves reducing the fuel flow rate to the combustor section 14, which results in a lesser total temperature of the gas entering the turbine section 16 of the gas turbine engine. As a consequence of the reduction of the total temperature of the gas entering the turbine section 16, the work extracted in the turbine section is insufficient to cause the compressor section 12 to operate at the preexisting compressor pressure ratio and corrected airflow, so that the compressor rotational speed decreases, the compressor pressure ratio decreases and the compressor corrected airflow also decreases. After flow transients diminish, steady state operation is again established at the combination of compressor corrected airflow and pressure ratio which correspond to the point on the operating line where the value of the ratio $T_{41}/T_{26}$ required is equal to the value of this ratio being maintained in the engine. After thermal transients in the heat exchangers 40 and 42 have diminished, the transfer of heat between the air in the flow path of the engine and the working fluid of the heat pump circuit is again minimized. The reduced flow rate, total temperature and total pressure of the gas entering the work extraction turbine 28 of the gas turbine engine 10, which are consistent with the new operating point on the operating line, result in the desired decrease in the work output of the engine.

In this manner, the steady state work output of the gas turbine engine can be varied to achieve any work output level consistent with the values of compressor pressure ratio, compressor corrected airflow and the ratio $T_{41}/T_{26}$ at any point on the portion of the operating line which represents lesser values of compressor pressure ratio and corrected airflow than at the reference point. Operation at points along this portion of the operating line is not substantially different than is found in conventional gas turbine engines. Operation at points along the portion of the operating line between the reference operating point and the design point is achieved in a manner substantially different than in conventional gas turbine engines.

Consider next the gas turbine engine 10 to be operating at the reference operating point with total temperature of the air entering the engine equal to the reference temperature and all components operating at the previously described conditions consistent with operation at this point. When it is desired to increase the work output of the engine to a value greater than that produced by operation of the engine at this point, the following actions are caused to occur. The control means 80 is activated such that the second valve 76 is opened allowing the flow of the greater pressure and greater temperature working fluid in the second heat exchanger 42 and compressor portion 56 of the heat pump 52 through the turbine portion 54 of the heat pump toward the lesser pressure, lesser temperature working fluid in the first heat exchanger 40 and the turbine portion 54 of the heat pump. When this working fluid flows through the turbine portion of the heat pump, work is extracted which starts the input shaft 62 rotating and decreases the total temperature of this working fluid. When the rotation of the shaft 62 has been started, the first valve 74 is opened to allow the working fluid in the first heat exchanger 40 to flow through the second conduit 68 and return to the input end of the compressor portion 56 of the heat pump 52, and the clutch means 78 is caused to couple the drive train 64 to connect the output shaft 38 of the turbine 28 with the work input shaft 62 of the heat pump. When the coupling of the drive train 64 is made complete, the shaft 62 rotates at a speed proportional to the work output shaft 38 of the gas turbine engine and a portion of the work output of the engine is diverted to supply work necessary to operate the compressor portion 56 of the heat pump. The compressor portion of the heat pump increases the total pressure and temperature of the working fluid returning from the first heat exchanger 40 through second conduit 68, before this working fluid flows through third conduit 70 to the second heat exchanger 42. Since the working fluid entering second heat exchanger 42 from third conduit 70 is at a greater temperature than the air flowing through the second heat exchanger 42, heat is exchanged between the working fluid of the heat pump and the air in the flow path of the gas turbine engine. This results in an increase in the total temperature of the air in the flow path of the engine and a decrease in the total temperature of the working fluid of the heat pump circuit. The still high pressure but now lower temperature working fluid leaving the second heat exchanger 42, flows through fourth conduit 72 to the work extraction turbine portion 54 of the heat pump 52, where as work is extracted the total temperature and pressure of the working fluid are decreased before the working fluid flows through first conduit 66 to the first heat exchanger 40. The work extracted in the work extraction turbine portion 54 of the heat pump contributes to driving the compressor portion 56 of the heat pump, and thus diminishes the proportion of the work extracted in the work extraction turbine section 16 of the gas turbine engine which must be diverted to drive the compressor portion of the heat pump. Because the working fluid entering the first heat exchanger 40 from the first conduit 66 is at a lesser total temperature than the air flowing through the first heat exchanger 40, heat is exchanged between the working fluid of the heat pump and the air in the flow path of the gas turbine engine. This results in a decrease in the total temperature of the air in the flow path of the engine and an increase in the total temperature of the working fluid in the flow path of the heat pump, which then is returned to the compressor portion 56 of the heat pump through second conduit 68.

The decrease in the total temperature of the air flowing through the first heat exchanger 40 results in an increase in the amount of air flowing into the gas turbine engine. This increase in the airflow rate is due to two phenomena. If the operating point is maintained at the reference operating point, then the compressor pressure ratio, corrected airflow, and the ratio $T_{41}/T_{26}$ must be maintained at the reference values. In order to maintain the compressor corrected airflow at this value, when the total temperature of the air entering the compressor section 12 is decreased, the rate at which air flows into the compressor section must increase. Since the rate at which air flows into the compressor section 12 is equal to the rate at which air flows into the heat exchanger 40, this must also increase. In order to maintain operation at this point on the operating line, the ratio $T_{41}/T_{26}$ must be maintained at a specific value. When the total temperature, $T_{26}$, of the air entering the compressor section 12 of the gas turbine engine is decreased, the specified value of the ratio can be maintained only by reducing the total temperature, $T_{41}$, of the gas entering the high pressure turbine 26 of the gas turbine engine. Since the total temperature, $T_{41}$, of the gas entering the high pressure turbine 28 of the engine is to be maintained at the maximum allowable level which meets the purposes of safety and durability, the ratio $T_{41}/T_{26}$ will increase to a value greater than that consistent with operation at the reference point on the operating line. The steady state operating conditions consistent with this increased value of the ratio $T_{41}/T_{26}$ are represented by a point on the operating line at greater values of both compressor corrected airflow and pressure ratio. When steady state operation at this new point on the operating line is achieved the amount of air flow into the first heat exchanger 40 will have increased both as a result of the increase in compressor corrected airflow and as a result of the increase in airflow which is required to obtain a specific value of compressor corrected flow at a lower total temperature of the air entering the compressor section 12. This increase in the airflow entering the engine and in the compressor pressure ratio results in an increase in the total pressure and flow rate of the gas entering the work extraction turbine 28 of the gas turbine engine, with the consequence that the work extracted in this turbine section 16 increases by an amount greater than the work required to drive the heat pump. In this manner, the gas turbine engine can be operated at operating conditions represented by a point on the operating line between the reference operating point and the design point.

By controlling the ratio of the total temperature of the air leaving the first heat exchanger 40 to the total temperature of the air entering this heat exchanger, operation at any point on the operating line between the reference operating point and the design point can be sustained. The total temperature of the air entering the compressor section 12 of the gas turbine engine can be reduced to a temperature which provides the value of the ratio $T_{41}/T_{26}$ consistent with operation of the gas turbine engine at any point on this portion of the operating line by maintaining the proper flow rate and total temperature of the working fluid of the heat pump circuit entering the first heat exchanger 40.

The flow rate and the total temperature of the working fluid of the heat pump circuit are controlled primarily by the rotational speed of the work input shaft 62 of the heat pump. When the clutch means 78 has coupled the drive train 64 to connect the work input shaft 62 of the heat pump and the output shaft 38 of the turbine section 16 of the engine 10, the rotational speed of the work input shaft 62 varies proportionally to the rotational speed of the work output shaft 38 of the engine turbine section. Increasing the rotational speed of the work output shaft 38 results in an increase in the rotational speed of the rotor 60 of the compressor portion 56 of the heat pump 52. The increase in the rotational speed of the heat pump compressor rotor 60 results in an increase in both the compressor pressure ratio of the heat pump and the flow rate of the working fluid through the heat pump circuit. The increase in the compressor pressure ratio of the compressor portion 56 of the heat pump causes an increase in the expansion ratio across its turbine portion 54, which results in a decrease in the total temperature of the working fluid of the heat pump which flows through first conduit 66 to the first heat exchanger 40. Thus, increasing the rotational speed of the work output shaft 38 of the gas turbine engine results in both an increase in the flow rate and a decrease in the total temperature of the working fluid of the heat pump circuit entering the first heat exchanger 40.

The rotational speed of the work output shaft 38 of the gas turbine engine can be increased by temporarily causing the work extracted in the work extraction turbine section 16 of the engine 10 to exceed the work required to drive the load imposed on the work output shaft 38 of the engine. The condition can be met either by temporarily increasing the work extracted in the work extraction turbine 28 of the gas engine or by temporarily decreasing the load applied to the output shaft 38. Only one of the many acceptable means of accomplishing the former is discussed hereafter.

When the gas turbine engine is operating at conditions represented by a point on the operating line between the reference operating point and the design point, and it is desired to further increase the work output of the engine, the work extracted in the work extraction turbine 28 of the engine is increased by increasing the expansion ratio across this turbine section 16. As the work extracted in the turbine section increases, the rotational speed of the shaft 38 increases. In the manner previously described, this increase in the rotational speed of the shaft 38 causes an increase in the flow rate and a decrease in the total temperature of the working fluid of the heat pump circuit entering the first heat exchanger 40. As a result of the increase in flow rate and decrease in total temperature of this working fluid, the total temperature of the air leaving this heat exchanger 40 is decreased further. By maintaining the total temperature of the gas entering the high pressure turbine 26 at the maximum allowable temperature as the total temperature of the air entering the compressor section 12 is decreased, the value of the ratio $T_{41}/T_{26}$ is caused to increase. This results in the work extracted in the high pressure turbine section 16 being greater than the work required to maintain the current compressor corrected airflow and pressure ratio. The compressor rotational speed, corrected airflow, and pressure ratio increase to values consistent with operation of the gas turbine engine at the point on the operating line where the value of the ratio $T_{41}/T_{26}$ equals the value of this ratio being maintained.

At the new operating point, the airflow entering the gas turbine engine will have increased in part due to the increase in corrected airflow entering the compressor section 12 and in part due to the increase in actual airflow necessary to provide a specific level of corrected airflow at the lower total temperature of the air entering the compressor section 12. The result of this increase in airflow entering the gas turbine engine and the increase in compressor pressure ratio is an increase in the total pressure and flow rate of the gas entering the work extraction turbine section 16 of the engine. This results in an increase in the work output of the engine. Since this increase in work output will tend to cause a further increase in the rotational speed of the work output shaft 38 of the engine turbine section 16 if the increased expansion ratio is maintained, it is necessary to readjust the expansion ratio across the work extraction turbine section 16 so that the rotational speed of the heat pump work input shaft 62 may be maintained at that speed necessary to maintain the desired temperature ratio $T_{23}/T_{26}$ across the first heat exchanger 40. In this manner, the gas turbine engine can be caused to operate at conditions represented by any of the points on the operating line between the reference operating point and the design point, with the result that work output from the engine can be increased above that produced at the reference operating point to any level up to and including the design work output. This can be achieved without exceeding the maximum allowable total temperature of the gas entering the tubine section 16 of the gas turbine engine.

When the gas turbine engine is being operated at conditions represented by any of the points on the operating line where the heat pump is operative, and it is desired to reduce the work output of the engine to a level at or below the reference work output, the clutch means 78 is actuated to uncouple the shaft 38 from the work input shaft 62 of the heat pump. Without work input, the turbine rotor 58 of the heat pump 52 will decrease its rotational speed with a resultant decrease in the total temperature of the working fluid of the heat pump circuit entering the first heat exchanger 40. The valves 74 and 76 are closed via activation of the control means 80 so that a greater pressure is maintained in the second heat exchanger 42 and the compressor portion 56 of the heat pump and a lesser pressure is maintained in the first heat exchanger 40 and the turbine portion 54 of the heat pump. The fuel flow rate to the combustor section 14 is decreased so that the total temperature of the gas entering the high pressure turbine 26 of the gas turbine engine does not exceed the maximum allowable temperature. In this manner, the work output level of the gas turbine engine can be reduced to a level at or below the reference work output where the operating conditions and hardware configuration are as previously described.

The preceding description of the operation of the preferred embodiment of the present invention was subject to the restriction that the total temperature of the air entering the gas turbine engine was equal to the reference design temperature. When the total temperature of the air entering the gas turbine engine is not equal to the reference design temperature, operation of the gas turbine engine is in all ways similar to the operation described agove, except that the point on the operating line dividing the portion of the operating line where the heat pump is operative from the portion of the operating line where the heat pump is inoperative may be varied from the reference operating point to meet the purposes of work output and fuel consumption provided that the purposes of safety and durability are also met. In addition, at total temperatures of the air entering the gas turbine engine greater than the design reference temperature, it may be necessary to prohibit operation at points approaching the design point in order to meet the purposes of safety and durability.

The preceding description of the method of operation of the preferred embodiment of the present invention applies equally well to a gas turbine engine in which either uncooled or cooled high pressure turbine section components are used. In the case of air cooled high pressure turbine section components, an additional benefit can be derived by operation of the present invention in accordance with the method described above. A portion of the air flowing through the compressor section 12 of the gas turbine engine 10 is withdrawn from the flow path of the engine at a location where the air has an appropriate temperature and pressure and is routed to cool the material from which the high pressure turbine section components are constructed. In the conventional gas turbine engine, when the work output of the engine is increased, the pressure and temperature of this air at the point where it is withdrawn from the compressor increases. As a result of the increase in the temperature of the cooling air, this air provides less cooling to the components of the high pressure turbine section and the temperature of the material from which these components are constructed increases. In contrast, when the work output of the present invention is increased with the gas turbine engine operating at conditions represented by the points on operating line between the reference operating point and the design point, the pressure of the cooling air increases but the total temperature of the cooling air decreases. As a result of this decrease in the temperature of the cooling air, this air provides more cooling to the components of the high pressure turbine section and the temperature of the material from which these components are constructed decreases. This decrease in temperature of the material from which these components are constructed can provide advantages in meeting the purposes of durability or, if the higher material temperature is tolerable, the maximum allowable temperature of the gas entering the high pressure turbine section of the gas turbine engine can be increased without exceeding the maximum allowable temperature of the material from which the components of the high pressure turbine are constructed. This increase in the total temperature of the gas entering the turbine section of the gas turbine engine provides an additional increase in the thermal efficiency with which the gas turbine engine operates.

It is thought that the present invention and many of its attendant advantages will be understood from the foregoing description and it will be apparent that various changes may be made in the form, construction and arrangement of the parts thereof without departing from the spirit and scope of the invention or sacrificing all of its material advantages, the form hereinbefore described being merely a preferred or exemplary embodiment thereof.

Having thus described the invention what is claimed is:

1. In a gas turbine engine including, in serial relationship, a compressor section, a combustor section and a turbine section, with said turbine section having an output shaft and all of said sections together defining a flow path, initially, for air and, later, for products of combustion through said engine, apparatus for improving the operating efficiency of said engine, comprising:
(a) a first heat exchanger disposed within said flow path of said engine upstream of said compressor section;
(b) a second heat exchanger disposed within said flow path of said engine upstream of said combustor section and downstream of said compressor section;
(c) pumping means interconnecting said first and second heat exchangers so as to cause cooling of air in said flow path at said first heat exchanger and heating of air in said flow path at said second heat exchanger; and
(d) means for coupling said output shaft of said turbine section with said pumping means so as to drive the latter with said output shaft.

2. Apparatus for improving operating efficiency of a gas turbine engine as recited in claim 1, wherein said pumping means includes:
a working fluid;
a heat pump; and
conduit means interconnecting said pump and said first and second heat exchanger so as to form an endless closed circulation path for said working fluid.

3. Apparatus for improving operating efficiency of a gas turbine engine as recited in claim 2, wherein:
said heat pump has a compressor portion, a turbine portion and an input shaft interconnecting said portions; and
said coupling means includes a drive train connecting said input shaft of said heat pump to said output shaft of said turbine section of said engine.

4. Apparatus for improving operating efficiency of a gas turbine engine as recited in claim 3, further comprising:
valve means incorporated in said conduit means and actuatable between open and closed conditions for respectively allowing and obstructing the flow of working fluid through said conduit means;
clutch means operatively connected with said drive train and selectively actuatable for coupling and uncoupling said heat pump to and from said engine; and
means for actuating said valve means and said clutch means so as to respectively close said valve means and uncouple said heat pump from said engine for rendering said heat pump inoperative, or to respectively open said valve means and couple said heat pump to said engine for rendering said heat pump operative, said heat pump when operative causing circulation of working fluid about said endless closed path and cooling of air in said flow path of said engine at said first heat exchanger and heating of air in said flow path of said engine at said second heat exchanger.

5. In a gas turbine engine including, in serial relationship, a compressor section, a combustor section and a turbine section, with said turbine section having an output shaft and all of said sections together defining a flow path, initially, for air and, later, for products of combustion through said engine, apparatus for improving the operating efficiency of said engine, comprising:
(a) a first heat exchanger disposed within said flow path of said engine upstream of said compressor section and having opposite inlet and outlet ends,
(b) a second heat exchanger disposed within said flow path of said engine upstream of said combustor section and downstream of said compressor section and having opposite inlet and outlet ends;
(c) a heat pump having a compressor portion, a turbine portion and an input shaft interconnecting said portions, said compressor and turbine portions each having input and output ends;
(d) a working fluid;
(e) a first conduit interconnecting said output end of said turbine portion of said heat pump with said inlet end of said first heat exchanger for providing flow of working fluid from said heat pump to said first heat exchanger;
(f) a second conduit interconnecting said outlet end of said first heat exchanger with said input end of said compressor portion of said heat pump for providing return flow of working fluid from said first heat exchanger to said heat pump;
(g) a third conduit interconnecting said output end of said compressor portion of said heat pump with said inlet end of said second heat exchanger for providing flow of working fluid from said heat pump to said second heat exchanger;
(h) a fourth conduit interconnecting said outlet end of said second heat exchanger with said input end of said turbine portion of said heat pump for providing return flow of working fluid from said second heat exchanger to said heat pump;
(i) a drive train interconnecting said output shaft of said turbine section of said engine with said input shaft of said heat pump for utilizing a portion of the work output of said engine to drive said heat pump;
(j) a clutch operatively connected with said drive train and selectively actuatable for coupling and uncoupling said heat pump to and from said engine;
(k) a first valve incorporated in said second conduit and actuatable between open and closed conditions for respectively allowing and obstructing the flow of working fluid through said second conduit;
(l) a second valve incorporated in said fourth conduit and actuatable between open and closed conditions for respectively allowing and obstructing the flow of working fluid through said fourth conduit; and
(m) means for actuating said first and second valves and said clutch so as to respectively close said valves and uncouple said heat pump from said engine for rendering said heat pump inoperative, or to respectively open said valves and couple said heat pump to said engine for rendering said heat pump operative, said heat pump when operative causing cooling of air in said flow path of said engine at said first heat exchanger and heating of air in said flow path of said engine at said second heat exchanger.

* * * * *